(No Model.)
C. T. MUSTIN.
MANUFACTURE OF ARTICLES FROM GLASS.
No. 293,977. Patented Feb. 19, 1884.
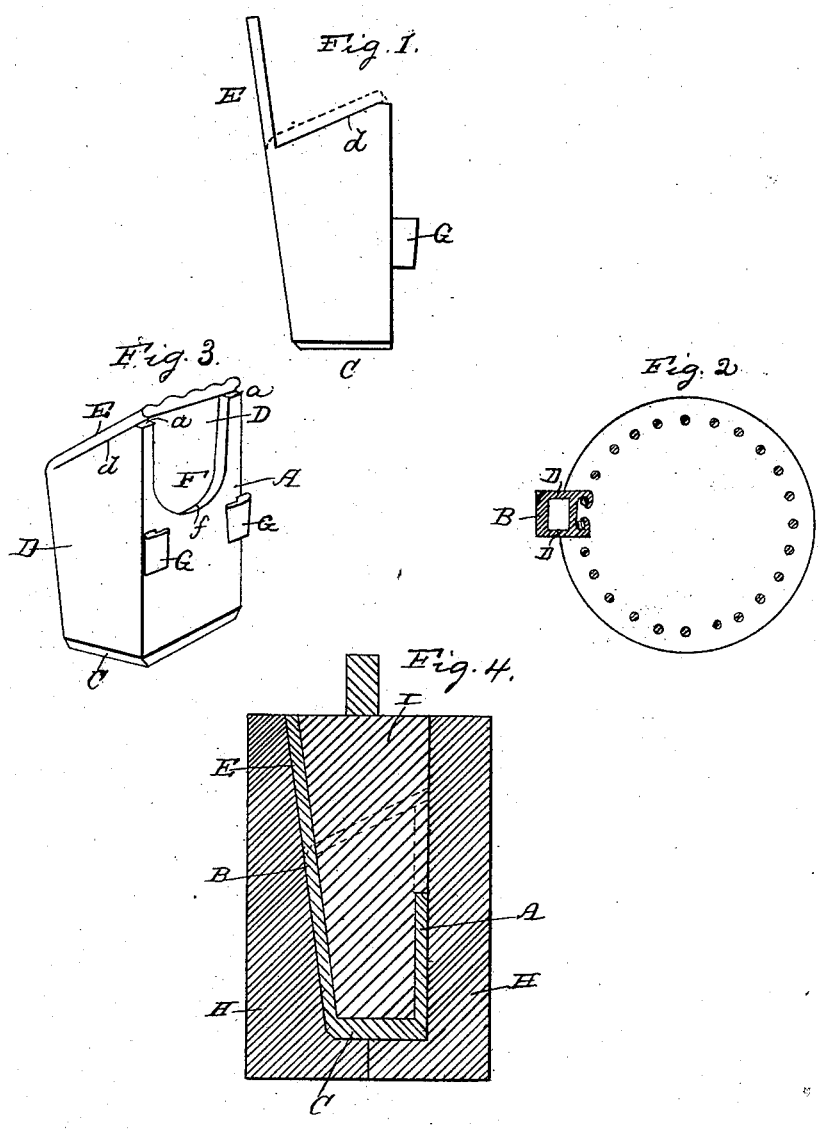
Witnesses:
L. H. Marshall
B. W. Sommers
Inventor:
Charles T. Mustin
by Doubleday & Bliss
Attys

UNITED STATES PATENT OFFICE.

CHARLES T. MUSTIN, OF PITTSBURG, PENNSYLVANIA, ASSIGNOR TO JOSEPH K. BROWN, OF CANTON, OHIO.

MANUFACTURE OF ARTICLES FROM GLASS.

SPECIFICATION forming part of Letters Patent No. 293,977, dated February 19, 1884.

Application filed October 22, 1883. (No model.)

*To all whom it may concern:*

Be it known that I, CHARLES T. MUSTIN, a citizen of the United States, residing at Pittsburg, in the county of Allegheny and State of Pennsylvania, have invented certain new and useful Improvements in Manufacture of Articles from Glass, of which the following is a specification, reference being had therein to the accompanying drawings.

This invention relates to an improvement in the method of manufacturing the seed-cups and water-holders ordinarily used in cages for birds, the object being also to produce by this method of manufacture articles superior to and cheaper than those heretofore in use. Those commonly used have been molded or otherwise shaped while the material of which they were composed was in a plastic state, in such ways as to form all of the walls and the lines of juncture integrally together. It is a matter of considerable difficulty to cast or mold them thus, and, as a result, these articles have cost considerably more than do those made in my improved way.

Figure 1 is a side view of a seed-holder or water-cup immediately after being molded or cast, and before the completing operation. Fig. 2 is a horizontal section of the same when in place on the cage. Fig. 3 shows the completed article. Fig. 4 shows the article while yet in the mold.

By means of a mold and former, as shown at H and I, Fig. 4, I form the blank shown in Fig. 1, the latter having the lower receptacle portion formed with a front slotted wall, A, a rear wall, B, a bottom, C, side walls, D D, and an upwardly-extending plate or top piece, E. However, any suitable mold and former can be employed to produce the blank thus described, and in the manufacture of a blank of this character the tedious and expensive operations of blowing, &c., can be avoided. After the blank has been formed by pressing in a mold, as above described, and while the glass is still hot and comparatively soft, the part E is bent down and pressed with sufficient force upon the upper edges, *d*, of the side walls and the upper edges, *a*, of the front. By performing this operation at this time, a tight joint can be effected and a perfect cover can be formed. The upper edges of the side walls incline downwardly and outwardly to the point where they join with the back B and the cover E. Therefore when the latter (the covered part) is bent down there will be a less sharp angle necessary between it and the back part, E, so that there will be less danger of breaking or cracking the glass in the region of the line of the joint.

In the front wall, A, there is a slot, F, extending from the top edges, *a*, downward sufficiently far, it having a rounded bottom, as shown at *f*, and through this the bird has ready access to the contents of the receptacle.

On the outer face of the front wall, A, I form one or more lugs, G G. These are preferably situated substantially as shown—that is to say, near the central horizontal line of the wall A—and are in cross-section L-shaped or so shaped as to permit them to be readily attached to the wires of the cage.

Instead of two lugs or ears of the character shown, one might be used, dovetailed in cross-section—that is to say, wider at the outer end; or it may be T-shaped, so that said outer end shall be adapted to engage with two of the wires of the cage for holding the vessel in place.

I am aware of the fact that glass articles—such as inkstands—have been made by blowing them in molds and leaving a tubular or party-tubular extension or extensions downward, which extension or extensions are afterward utilized to form a bottom; but my process of manufacture is different from and superior to that last alluded to.

Heretofore it has been necessary to reheat all of the articles manufactured, inasmuch as by the time the first steps have been completed the material is so cold as to prevent its being treated in the way followed by me; and, moreover, the devices employed have been of such nature as to necessitate this reheating. In my case, immediately after the former is withdrawn from the mold the part E is bent down, as shown in Fig. 4, and secured to the upper edges of the sides D D.

What I claim is—

1. The herein-described process of manufacturing glass seed-cups and water-holders for bird-cages, it consisting in first forming, by means of a press, a blank having the lower or receptacle portion proper formed with walls entirely around the vessel, and having an upwardly-projecting plate, and then, before the glass leaves the mold, bending said upwardly-projecting plate down to and upon the upper edges of the wall of the receptacle portion, substantially as set forth.

2. The herein-described seed-receptacle or water-holder for bird-cages, it having the lower or receptacle portion formed with the walls entirely around and integrally with each other, and with the top formed integrally with one of the walls and secured to the tops of the others by welding after being bent into proximity to them, substantially as set forth.

3. A seed-holder or water-receptacle for bird-cages, having the front slotted wall, A, the side walls, D D, whose upper edges incline downwardly and backwardly, the rear wall, B, formed integrally with the side walls, D D, and formed also with the upwardly-projecting extension E, which can be bent downward into the proximity to the upper edge of the side walls, D, and the front wall, substantially as set forth.

In testimony whereof I affix my signature in presence of two witnesses.

CHARLES T. MUSTIN.

Witnesses:
GEO. E. BALDIN,
HENRY FISHER.